Aug. 17, 1965 Z. G. LYON 3,201,691

REPEATER TERMINAL

Filed March 23, 1962 2 Sheets-Sheet 1

INVENTOR.
ZENO G. LYON
BY Alfred C. Hill
AGENT

Aug. 17, 1965 Z. G. LYON 3,201,691

REPEATER TERMINAL

Filed March 23, 1962 2 Sheets-Sheet 2

INVENTOR.
ZENO G. LYON
BY Alfred C. Hill
AGENT

United States Patent Office 3,201,691
Patented Aug. 17, 1965

3,201,691
REPEATER TERMINAL

Zeno G. Lyon, Plainfield, N.J., assignor to International Telephone and Telegraph Corporation, Nutley, N.J., a corporation of Maryland Filed Mar. 23, 1962, Ser. No. 181,994
17 Claims. (Cl. 325—11)

This invention relates to multiplex communication systems and more particularly to a repeater terminal for multiplex communication systems of the frequency division type.

Frequency division multiplex communication systems operable over a long distance, and employing one or more repeater terminals, have in the past resulted in a pro-hibitive accumulation of distortion of the transmitted signal due to the repeated demodulation to baseband and remodulation from baseband at the repeater terminals. It was primarily for this reason that intermediate frequency coupled repeater terminals have been resorted to in long haul, frequency division multiplex communication systems. In this type of repeater terminal, the intermediate frequency signal of the terminal receiver is coupled directly to the intermediate frequency portion of the terminal transmitter without demodulation to baseband and remodulation from baseband. However, when the need arises for extraction or insertion of channel signals at a repeater terminal, it has been a common practice to demodulate and remodulate the entire video signal with the attendant distortion. In the demodulation and remodulation process, the principal problem arises from the nonlinearity of the demodulator and modulator. In present practice, the distortion of these components is in the order of 60 db (decibels) as measured by noise loading tests.

In a copending application to W. L. Glomb entitled, "Multiplex Repeater Terminal," Serial No. 41,403, filed July 7, 1960, now U.S. Patent No. 3,180,938, and assigned to the same assignee as the present application, a system has been disclosed which provides drop-and-insert facilities and yet eliminates distortion of the signal due to the demodulating and remodulating process of the prior art arrangements. The system disclosed in the above-identified copending application employs a phase detector or comparator coupled to the output of the terminal receiver, and a frequency modulated oscillator coupled to the terminal transmitter and also to the second input of the phase comparator. The output of the phase comparator provides a signal proportional to the baseband of the received signal which is coupled to the frequency modulated oscillator for frequency control thereof in a manner to cause the output signal of the frequency modulated oscillator to follow the input signal to the phase comparator from the terminal receiver. In the feedback loop from the output of the phase comparator to the frequency control element of the frequency modulated oscillator is inserted a band rejection filter to pass all those channels in the baseband of the received signal other than the frequency segments or channels which are desired to be dropped at the repeater terminal. The dropped channels can be extracted from the output of the phase comparator prior to its application to the band rejection filter and the signals to be inserted in the vacated frequency segments can be inserted prior to the application of the signal to the control element of the frequency modulated oscillator. It has been found that, while under certain circumstances the system of the copending application operates satisfactorily, there are situations where instability can develop in the feedback circuit. This is due to the fact that the equivalent open loop phase shift of the feedback circuit from the output of the phase comparator to the input of the frequency modulated oscillator is always a minimum of 90 degrees lagging. The added filter, the band rejection filter, will cause instability if this filter ever produces as much as 90 degrees lagging phase shift while the open loop gain is unity or greater. A possibility of this instability is apparent when it is considered that the filter in the feedback loop must have a large phase slope if it is to have a large amplitude slope. Thus, there are certain conditions which could cause instability in the repeater terminal arrangement of the copending application.

Therefore, it is an object of this invention to provide an improved repeater terminal retaining the advantage of the above-identified copending application and eliminating the possibility of instability in the circuit arrangement.

A feature of this invention is the provision of a repeater terminal for a communication system, such as a frequency division multiplex system, transmitting a composite signal including a plurality of distinct frequency segments, such as frequency spaced signal channels comprising a receiver for the composite signal, a transmitter for the composite signal, a network including two signal paths coupled in shunt relationship, each of the paths including a source of signal of predetermined frequency cooperating to product a resultant signal having a frequency predeterminedly related to the frequency of the composite signal, means coupled to the receiver and the network to control the frequency of both the signal sources to cause the frequency of the resultant signal to follow the frequency of the composite signal, and means to couple the transmitter to the network.

Another feature of this invention is the provision of components in the two signal paths of the network to provide the two signal paths with complementary amplitude-versus-phase characteristics.

Still another feature of this invenion is the provision of a phase comparator responsive to the received composite signal and the resultant signal at the output of the network to control the frequency of a frequency modulated oscillator disposed in each of the paths with a bandpass filter being coupled to the input of one of the frequency modulated oscillators having given amplitude-versus-frequency and phase-versus-frequency characteristics, hereinafter referred to as amplitude and phase characteristics, and a band rejection filter coupled to the input of the oscillator of the other path having amplitude and phase characteristics complementary to the given amplitude and phase characteristics.

Still a further feature of this invention is the extraction of the signals of the frequency segment for drop channel purposes at the input of the oscillator included in the path including the bandpass filter or at the output of this oscillator.

Still another feature of this invention is the provision of means coupled to the path including the band rejection filter at the output of the frequency modulated oscillator in this path to insert the signal to be disposed in the frequency segment removed at the terminal.

Still a further feature of this invention is the provision of a mixer responsive to the resultant signal output of the network and the received composite signal and a frequency discriminator coupled to the mixer to produce a signal to control the frequency of the signal source of the two paths of the network to cause the frequency of the resultant signal to follow the frequency of the composite signal.

The above-mentioned and other features and objects of this invention will become more apparent by reference to the following description taken in conjunction with the accompanying drawings, in which.

Figure 1:
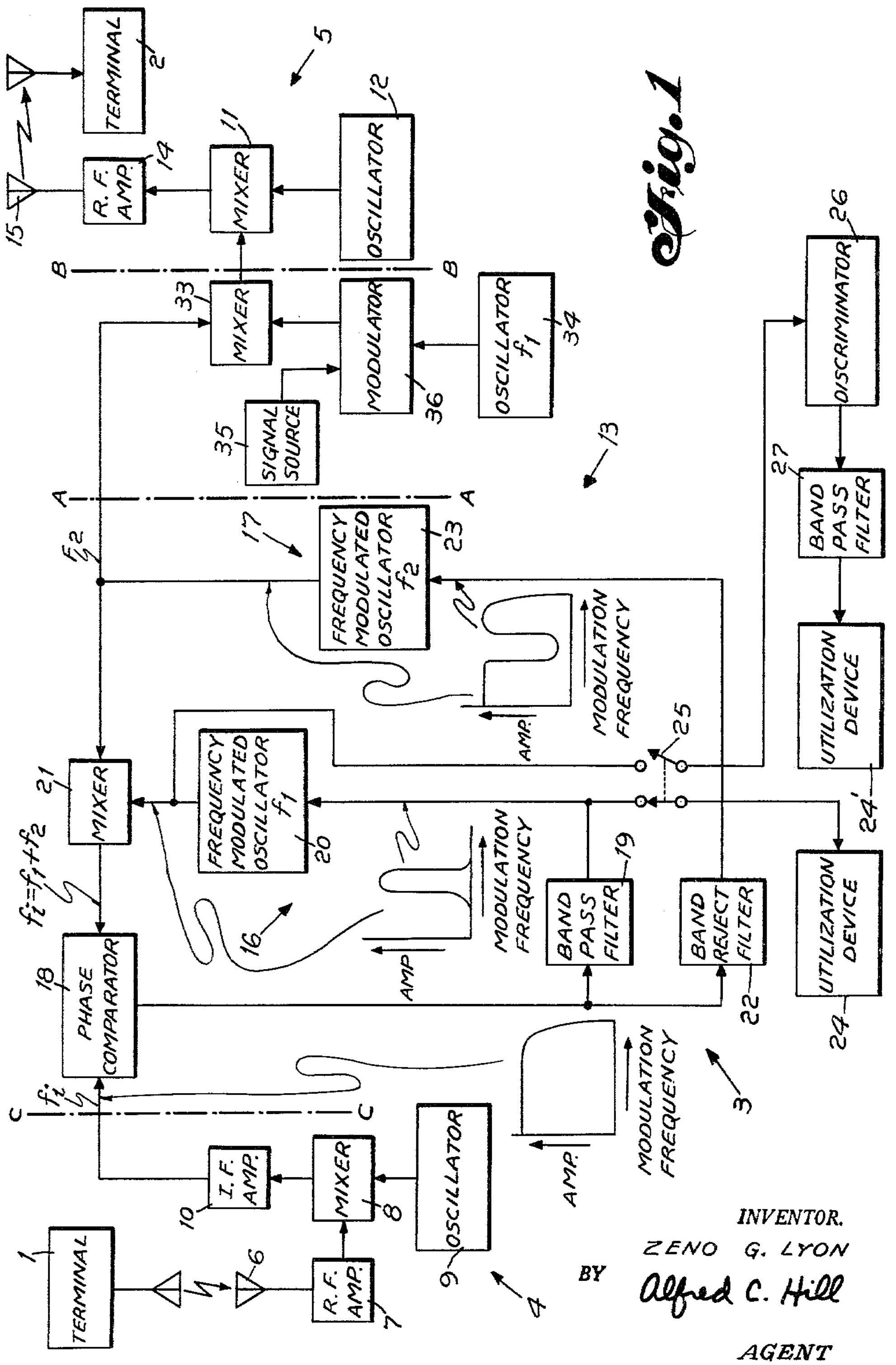
FIG. 1 is a schematic diagram in block form of a communication system employing a multiplex repeater terminal following the principles of this invention.

Referring to FIG. 1, there is illustrated therein in block diagram form a communication system following the principles of this invention. For purposes of explanation, a frequency division multiplex system incorporating the repeater terminal of this invention will be described. It is to be observed, however, that any composite signal having a multiplicity of distinct frequency segments may be operated on by the repeater terminal of this invention. The baseband signal of a frequency division multiplex system is a multiplex signal having the usual character for frequency division multiplex, namely, a plurality of sub-carrier signals separated one from the other to provide signal channels with each of the sub-carrier signals being frequency modulated by intelligence to be transmitted. The baseband signal is then operated on to translate the frequency spectrum thereof to the appropriate frequency region for propagation in the communication medium. The frequency translated baseband may be propagated by frequency modulating a radio frequency carrier. For instance, the baseband signal may be provided at terminal 1 for transmission to terminal 2 along a communication medium including therein repeater terminal 3 which in certain instances may be a branch terminal repeater station receiving intelligence signals from a propagation path which makes an angle with the propagation path between terminals 1 and 2. Repeater terminal 3 also may generate signals to enable communication between terminal 3 and terminal 2.

It should be noted that the communication system outlined hereinabove is by way of example only, since terminals 1 and 2 could be repeater terminals and include the same components as terminal 3 and there could be more repeater terminals between either terminal 1 and terminal 3 or terminal 3 and terminal 2. Also for the sake of simplicity, the communication system is illustrated as being a one-way communication system. It is obvious that two-way communication may be obtained between terminals 1 and 2 through terminal 3 by providing a second communication path between terminals 2 and 1 via terminal 3 with the appropriate duplication of equipment necessary to carry on this two-way communication. If, of course, proper consideration is taken, the only duplication would be necessary in the equipment between lines A—A and B—B of terminal 3.

Turning now to the description of repeater terminal 3, a receiver 4 receives the multiplex signal from terminal 1 and a transmitter 5 transmits the multiplex signal from terminal 3 to terminal 2. Receiver 4 is illustrated as including an antenna 6, a radio frequency (RF) amplifier 7 coupled to a heterodyning circuit including mixer 8 and oscillator 9 to produce an intermediate frequency (IF) version of the received RF multiplex signal for application to IF amplifier 10. Transmitter 5 is illustrated as including a heterodyning circuit including mixer 11 and oscillator 12 to raise the IF signal output of network 13 to the RF region for application to RF amplifier 14 and, hence, to antenna 15 for propagation to terminal 2.

Network 13 includes two signal paths 16 and 17 coupled in shunt relationship, each of the paths 16 and 17 including a source of signal of predetermined frequency cooperating to produce a resultant frequency having a frequency predeterminedly related to the frequency of the multiplex signal at the output of amplifier 10. Means illustrated in the embodiment of FIG. 1 as phase comparator or detector 18, responds to the output of amplifier 10 and the output of network 13 to produce a signal to control the frequency of both the signal sources of paths 16 and 17 to cause the frequency of the resultant signal to follow the frequency of the multiplex signal at the output of amplifier 10.

More specifically, path 16 includes bandpass filter 19 having a pass band characteristic to pass the predetermined frequency segment or segments, such as signal channel or channels, of the frequency multiplex signal to a frequency modulated oscillator 20 whose output is coupled to one input terminal of mixer 21. Path 17 includes band rejection filter 22 having a pass band characteristic complementary to the pass band characteristic of filter 19 to reject the frequency segments passed by filter 19 and pass the other frequency segments. The signal output of filter 22 is then coupled to the frequency modulated oscillator 23 whose signal output is coupled to the other input terminal of mixer 21. The signal output of mixer 21 is the resultant signal at the output of network 13 and is coupled to phase comparator 18 to produce a control signal proportional to the phase difference between the signal output of amplifier 10 and the resultant signal output of mixer 21. The difference or control signal at the output of phase comparator 18 is coupled to the input of network 13, passed through the bandpass filters 19 and 22 and, hence, to oscillators 20 and 23, resulting in a modulation of oscillator 20 by those frequency segments passed by filter 19 and a modulation of oscillator 23 by those frequency segments passed by filter 22. The output signals of oscillators 20 and 23 are coupled to mixer 21 whose output is the resultant signal coupled to phase comparator 18 for comparison with the signal output of amplifier 10.

The control signal at the output of phase comparator 18 will be the baseband of the IF signal at the output of amplifier 10 if the frequencies of oscillators 20 and 23 are selected to provide a mean frequency for the resultant signal at the output of mixer 21 equal to the mean frequency of the IF signal at the output of amplifier 10. This will be apparent from the following discussion. Consider first that the IF signal at the output of amplifier 10 is not modulated. Thus, with the frequency of oscillators 20 and 23 selected as stated above, phase comparator 18 will not produce a control signal since the frequency of the IF signal and the resultant signal are identical. Consider now the first instant that frequency modulation is present on the IF signal. Phase comparator 18 will produce a control signal which is proportional to the phase difference between the IF signal and the resultant signal. It will be observed that the phase difference between the signals compared is due to the frequency modulation and, therefore, the control signal is proportional to the modulating signal or baseband. This control signal is coupled to network 13 to frequency modulate oscillators 20 and 23 as above described. Under this condition, the resultant signal will now have the same frequency modulation thereon as was present on the IF signal. During the next instant of time, the resultant signal modulated in accordance with the modulation of the IF signal during the first instant will be compared with the IF signal modulated differently than during the first instant. The control signal will be proportional to the phase difference between the two signals at this instant of time and will, thus, cause the resultant signal to assume the modulation present on the IF signal. This comparison process is continued on an instantaneous basis. Thus, from the foregoing it is apparent that the frequency of the resultant signal lags the frequency of the IF signal or, in other words, follows the frequency of the IF signal. It is also apparent that the control signal output is the baseband of the IF signal.

To prevent the development of instability in the feedback loop or phase lock loop including paths 16 and 17 in accordance with this invention, the amplitude and phase characteristics of filters 19 and 22 are designed to be complementary and the resultant signal coupled from the output of mixer 21 is the whole baseband of the signal coupled from amplifier 10.

To provide drop channel facilities, it would be possible to couple the utilization device 24 directly to the output of bandpass filter 19, since this filter passes only those channels or frequency segments which are desired to be utilized at repeater terminal 3. Utilization device 24 can be a speaker or other device at the repeater terminal 3 itself, or may be the appropriate modulation equipment for propagation of the dropped channels from terminal 3 to a branch propagation medium and branch terminal (not illustrated). An alternative arrangement for dropping the selected channel or channels may be obtained by moving the ganged switch 25 to its other position so as to couple a discriminator 26 to the output of oscillator 20, thereby providing a frequency modulated version of the frequency channel or channels passed by filter 19. Discriminator 26 frequency demodulates the frequency modulated channels passed by filter 19 with the output of discriminator 26 being coupled to bandpass filter 27 to clean up the edges of the dropped signal channels and, hence, to utilization device 24' which may be the same type of utilization device described hereinabove with respect to utilization device 24. It should be understood that utilization device 24 may include a bandpass filter coupled to the input thereof to clean up the signals coupled thereto, such as is accomplished by bandpass filter 27.

Since the signals of the channels selected by bandpass filter 19 are to be utilized in terminal 3, or in a further branch terminal coupled to terminal 3, the selected dropped channels should be removed from the baseband so that they are not coupled to transmitter 5 and, hence, to terminal 2. To accomplish this end, band rejection filter 22 is designed to have a rejection band substantially identical with the pass band of filter 19 to remove the channel or group of channels dropped at terminal 3. As mentioned hereinabove, the amplitude and phase characteristics of rejection filter 22 should be complementary to filter 19 to remove the possibility of instability being developed in the feedback loop of network 13. By removing the dropped channel or channels, the baseband coupled to oscillator 23 for modulation thereof includes one or more signal channels (frequency bands) which have been eradicated. It is now possible to insert in the vacant signal channel or channels, signals originating at terminal 3 or received at terminal 3 from a branch terminal, for coupling to terminal 2. This may be accomplished in one arrangement by coupling mixer 33 to path 17 at the output of oscillator 23. Oscillator 34 provides a subcarrier signal having a frequency disposed in the baseband frequency range so the modulating signal of source 35 can be modulated in modulator 36 on the subcarrier signal of oscillator 34 to occupy the eradicated signal channel or channels contained in the base band at the output of oscillator 23. The output of mixer 33 would then be coupled to the input of mixer 11 to permit transmission of the original baseband signals plus the signals inserted at terminal 3 to terminal 2.

Since, as pointed out hereinabove, the resultant signal of mixer 21 follows the IF signal at the output of amplifier 10, the output signal of oscillator 23 will likewise follow the frequency of the IF signal at the output of amplifier 10 for those portions of the signal at the output of amplifier 10 which are passed by rejection filter 22. Thus, there actually is no demodulation of the signal at the output of amplifier 10 prior to being coupled to the transmitter for repropagation, thereby eliminating the distortion heretofore present due to the non-linearity of the demodulator and modulator. Thus, there results a drop-and-insert repeater terminal which eliminates the previously experienced accumulation of distortion in repeater terminal operation. Further, since bandpass filter 19 and band rejection filter 22 have complementary amplitude and phase characteristics and the signal coupled from the output of mixer 21 includes all the bandbase components for comparison against the baseband components applied from the output of amplifier 10, the possibility of instability in the phase lock loop of this invention is substantially eliminated.

To summarize, the entire baseband operates to modulate two oscillators to produce a resultant signal for comparison with an IF signal derived from the terminal receiver. The error signal at the output of comparator 18, which represents the frequency discrepancy and the distortion of the frequency in network 13 relative to the received frequency modulated signal, is fed back to the oscillators 20 and 23 to correct the distortion and to provide a signal capable of modulating the transmitter in accordance with the baseband signal. With this arrangement the system functions essentially as a directly coupled intermediate frequency repeater since the transmitter IF carrier is corrected in frequency deviation and distortion to agree with the receiver IF carrier.

Figures 2, 3, 4:
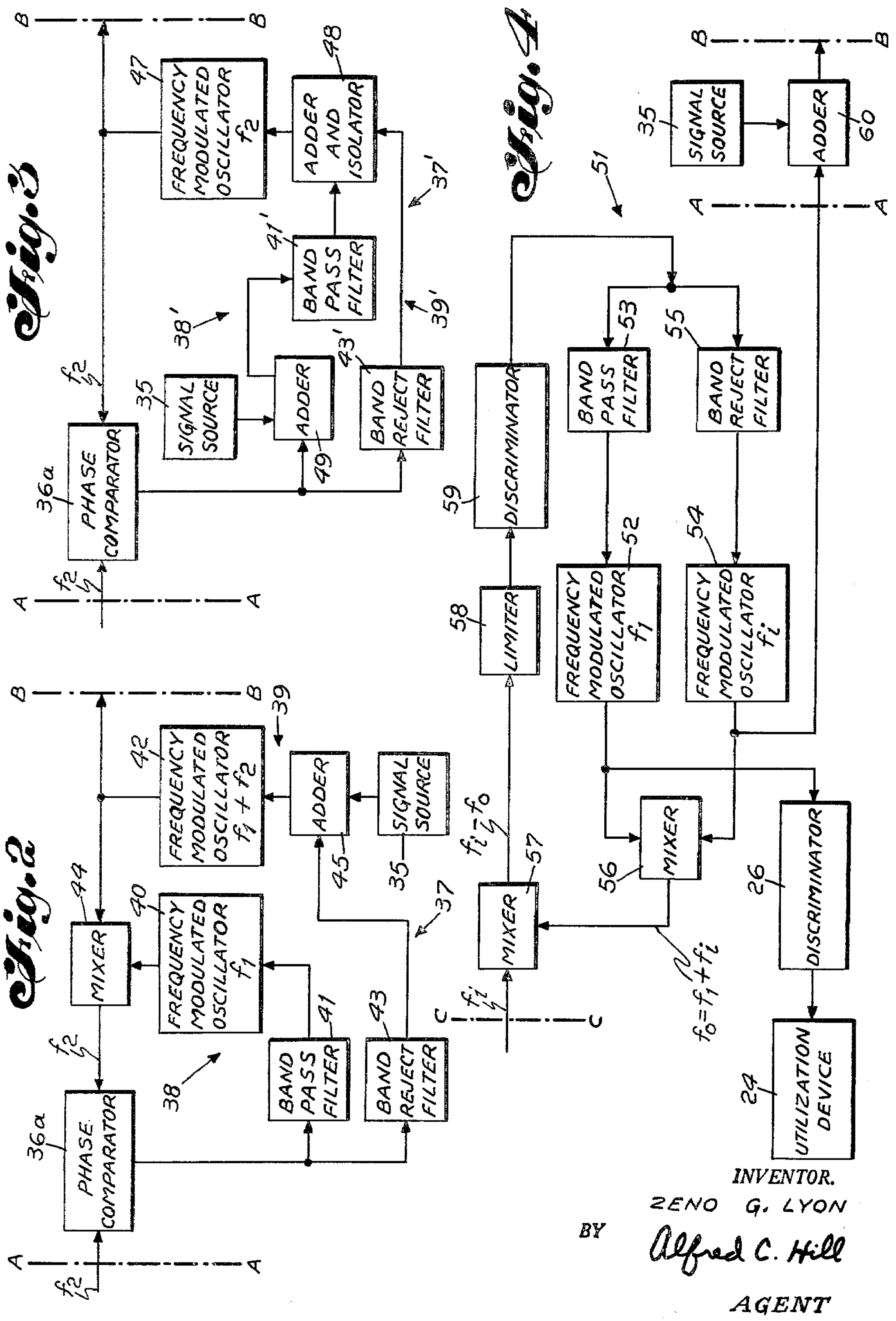
FIG. 2 is a schematic diagram in block form illustrating another arrangement for the equipment between lines A—A and B—B of the system of FIG. 1.
FIG. 3 is a schematic diagram in block form of still another arrangement for the equipment between lines A—A and B—B of the system of FIG. 1.
FIG. 4 is a schematic diagram in block form of another embodiment for the equipment between lines C—C and B—B of FIG. 1.

Referring now to FIG. 2, an alternative arrangement for the components between lines A—A and B—B of FIG. 1 is illustrated. As pointed out hereinabove, the output signal of oscillator 23, FIG. 1, includes the baseband with the eradicated signal channel or channels. The output signal of oscillator 23 is coupled to phase comparator 36. A network 37, substantially identical with network 13, FIG. 1, includes two signal paths 38 and 39 coupled in shunt relation. Each of these paths includes a signal source which is controlled by the output of comparator 36 substantially in the manner accomplished by network 13. More specifically, network 37 includes in path 38 a frequency modulated oscillator 40 having the control signal of comparator 36 coupled to the frequency control element thereof by means of bandpass filter 41 and path 39 includes a frequency modulated oscillator 42 having the control signal from comparator 36 coupled through a band rejection filter 43 to the frequency control element of oscillator 42. By adjusting the frequencies of oscillators 40 and 42 to provide a resultant frequency at the output of mixer 44 having a mean frequency equal to the mean frequency of the output signal of oscillator 23, a control signal can be developed in comparator 36 proportional to the phase difference between the two signals to cause the difference signal to control the frequency of oscillators 40 and 42 in a manner to cause the resultant signal at the output of mixer 44 to follow the signal at the output of oscillator 23. Thus, a second phase lock loop is provided which will lock the resultant signal at the output of mixer 44 to the output signal of oscillator 23. Now to insert the signal or signals to occupy the eradicated channels in the baseband all that is necessary is to provide an adder 45 in path 39 between the output of filter 43 and the frequency control element of oscillator 42. Adder 45 operates to add the signals from source 35, properly disposed in the frequency spectrum to occupy the eradicated frequency segments or channels, to the output signal of filter 43. The frequency modulation on the output signal of oscillator 42 will include the baseband output of filter 43 and the inserted signals. This signal would then be coupled to mixer 11 of FIG. 1 for transmission to terminal 2. By selecting the frequency of oscillators 40 and 42 as illustrated in FIG. 2, the output coupled to mixer 11 of FIG. 1 will have the same frequency as the output of amplifier 10. It would also be possible in this and the other arrangements disclosed therein to select the frequencies of the frequency modulated oscillators to shift the frequency of the signal coupled to the transmitter to be different from the frequency of the signal coupled from the receiver. With this arrangement it would, of course, be necessary to select the proper output (the sum or difference frequency signal) from the mixer so that the resultant signal will have a mean frequency equal to the mean frequency of the received IF signal.

Referring to FIG. 3, another arrangement for the equipment between lines A—A and B—B of FIG. 1 is illustrated. In this arrangement the output of oscillator 23 is coupled to phase comparator 36 and the resultant signal at the output of network 37′ is produced by frequency modulating a single frequency modulated oscillator 47. The remainder of network 37′ includes a first path 38′ including a bandpass filter 41′ for passing the eradicated frequency band (signal channel) and a second path 39′ including band rejection filter 43′ to pass all the signal components other than the components passed by filter 41′. The outputs of filters 41′ and 43′ are coupled to an adder and isolator 48 to add the signals at the output thereof and to maintain these filters isolated one from the other. The output signal of adder and isolator 48 is coupled to the frequency control element of oscillator 47 to control the frequency thereof so that the resultant signal coupled to phase comparator 36 will follow the frequency of the signal coupled from oscillator 23, FIG. 1. Thus, the difference signal or control signal is fed through paths 38′ and 39′ and combined in adder and isolator 48 to control the frequency of oscillator 47. In this arrangement the channel signal or signals are added to the baseband by employing an adder 49 which adds the signals of source 35 to the baseband provided the signals of source 35 have a center frequency or center frequencies properly located in the frequency spectrum of the baseband to occupy the eradicated frequency band. Here again the circuit will lock up as in the previous arrangements to maintain the output signal of oscillator 47 in step with the frequency of the signal at the output of oscillator 23. The output signal of oscillator 47 is coupled to mixer 11 for transmission to terminal 2.

In the embodiments of FIGS. 1, 2, and 3 the characteristic compared in the means to control the frequency of the two oscillators (phase comparator 18) has been the phase of the two signals with the difference or control signal maintaining the resultant signal at the output of network 13 in step with the input signal to phase comparator 18. In the embodiment illustrated in FIG. 4, similar network components are employed and the technique is substantially the same as that described in connection with FIGS. 1, 2, and 3 with the exception that the characteristic of the resultant signal and the received signal compared is frequency variation. The embodiment illustrated in FIG. 4 can be substituted for the equipment illustrated in FIG. 1 between lines C—C and B—B. As in the embodiment of FIG. 1, a network 51 is provided having two signal paths coupled in shunt relation. The first signal path includes a frequency modulated oscillator 52 and a bandpass filter 53 while the second signal path includes a frequency modulated oscillator 54 and a band rejection filter 55. The output signals of oscillators 52 and 54 are coupled to mixer 56 with the frequency of the two oscillators being arranged to provide a means frequency for the resultant signal output of mixer 56 which is in a predetermined frequency relationship with the mean frequency of the received signal coupled from amplifier 10 to mixer 57. The output of mixer 56 is coupled to mixer 57 to produce a beat signal at the output thereof. The beat signal is coupled to limiter 58 for amplitude control and, hence, to discriminator 59 which produces a control signal proportional to the frequency difference between the signal output of mixer 56 and the signal coupled from amplifier 10. The control signal at the output of discriminator 59 is coupled to network 51 and, hence, will control the frequency of oscillators 52 and 54 in a manner to maintain the frequency of the resultant signal output of mixer 56 in the predetermined frequency relationship with the frequency of the signal applied from amplifier 10. As in the embodiments previously described, bandpass filter 53 will have a pass band characteristic to pass a frequency segment (signal channel) or a plurality of frequency segments, depending upon the signals to be dropped at the repeater terminal 3. The band rejection filter 55 will have a complementary pass band characteristic to that of filter 53 to pass all those other frequency segments that are not passed by filter 53 and to block the frequency segments passed by filter 53. In addition, the amplitude and phase characteristics of these two filters are complementary. The channels to be dropped may be dropped by coupling discriminator 26 to the output of oscillator 52 with the resultant detected frequency modulated frequency segments being coupled to utilization device 24 which can include a bandpass filter at the input thereof to clean up the detected baseband channel signals. To add the signal or signals originating at terminal 3 or received at terminal 3 from branch terminals, adder 60 is coupled to the output of oscillator 54 to add the signal of source 35 having a carrier frequency properly disposed in the frequency spectrum of the baseband to occupy the frequency segment or segments of the channel signals dropped at terminal 3. The output signal of adder 60 is then coupled to mixer 11 and, hence, to terminal 2. It should be further pointed out that the reinsertion arrangements between lines A—A and B—B of FIGS. 1, 2, and 3 can be substituted for the equipment between lines A—A and B—B of FIG. 4.

The repeater terminal arrangements described hereinabove have the advantage of being physically simple and economical in that demodulators and modulators at baseband level are eliminated and, in addition, have the advantage of being virtually distortionless. The fact that the repeater terminal of this invention is distortionless is because the non-linearity of the modulation characteristic of the frequency modulated oscillators is reduced by the loop gain of the phase or frequency comparison circuit. Moreover, due to the complementary characteristics of the bandpass and band rejection filters and, since the full baseband signal is utilized for comparison purposes in the arrangements of this invention, a very high loop gain can be employed without instability.

While I have described above the principles of my invention in connection with specific apparatus, it is to be clearly understood that this description is made only by way of example and not as a limitation to the scope of my invention as set forth in the objects thereof and in the accompanying claims.

I claim:

1. A repeater terminal for a communication system transmitting a composite signal comprising:
  a receiver for said composite signal;
  a transmitter for said composite signal;
  a network including two signal paths coupled in shunt relationship, each of said paths including a source of signal of predetermined frequency cooperating to produce a resultant signal having a frequency predeterminedly related to the frequency of said composite signal;
  means coupled to the output of said receiver and the output of said network to produce a control signal;
  means to couple said control signal to the input of said network to control the frequency of both said signal sources to cause the frequency of said resultant signal to follow the frequency of said composite signal; and
  means to couple said transmitter to said network.

2. A repeater terminal for a communication system transmitting a composite signal comprising:
  a receiver for said composite signal;
  a transmitter for said composite signal;
  a network including two signal paths coupled in shunt relationship having complementary amplitude and phase characteristics, each of said paths including a source of signal of predetermined frequency cooperating to produce a resultant signal having a frequency predeterminedly related to the frequency of said composite signal;
  means coupled to the output of said receiver and the output of said network to produce a control signal;
  means to couple said control signal to the input of said network to control the frequency of both said signal sources to cause the frequency of said resultant signal to follow the frequency of said composite signal; and means to couple said transmitter to said network.

3. A repeater terminal for a communication system transmitting a composite signal including a plurality of frequency segments comprising:

a receiver for said composite signal;

a transmitter for said composite signal;

a network including two signal paths coupled in shunt relationship having complementary amplitude and phase characteristics, each of said paths including a source of signal of predetermined frequency cooperating to produce a resultant signal having a frequency predeterminedly related to the frequency of said composite signal;

means coupled to the output of said receiver and the output of said network to produce a control signal;

means to couple said control signal to the input of said network to control the frequency of both said signal sources to cause the frequency of said resultant signal to follow the frequency of said composite signal;

means to couple said transmitter to said network; and means coupled to one of said paths to extract the signal of at least one of said frequency segments.

4. A repeater terminal for a communication system transmitting a composite signal including a plurality of frequency segments comprising:

a receiver for said composite signal;

a transmitter for said composite signal;

a network including two signal paths coupled in shunt relationship, each of said paths including a source of signal of predetermined frequency cooperating to produce a resultant signal having a frequency predeterminedly related to the frequency of said composite signal;

a first means having given amplitude and phase characteristics disposed in one of said paths to pass at least a selected one of said frequency segments;

a second means having amplitude and phase characteristics complementary to said given amplitude and phase characteristics disposed in the other of said paths to pass all said frequency segments other than said selected frequency segments;

means coupled to the output of said receiver and the output of said network to produce a control signal;

means to couple said control signal to the input of said network to control the frequency of both said signal sources to cause the frequency of said resultant signal to follow the frequency of said composite signal;

means to couple said transmitter to said other of said paths; and means coupled to said one of said paths to extract the signal of said selected frequency segments.

5. A repeater terminal for a communication system transmitting a composite signal including a plurality of frequency segments comprising:

a receiver for said composite signal;

a transmitter for said composite signal;

a network including two signal paths coupled in shunt relationship, each of said paths including a source of signal of predetermined frequency cooperating to produce a resultant signal having a frequency predeterminedly related to the frequency of said composite signal;

a first means having given amplitude and phase characteristics disposed in one of said paths to pass at least a selected one of said frequency segments;

a second means having amplitude and phase characteristics complementary to said given amplitude and phase characteristics disposed in the other of said paths to pass all said frequency segments other than said selected frequency segments;

means coupled to said receiver and said network to control the frequency of both said signal sources to cause the frequency of said resultant signal to follow the frequency of said composite signal;

means to couple said transmitter to said other of said paths;

means coupled to said one of said paths to extract the signal of said selected frequency segments;

the output of said first means being coupled to the source of signal of said one of said paths; and said means to extract being coupled to said output of said first means.

6. A repeater terminal for a communication system transmitting a composite signal including a plurality of frequency segments comprising:

a receiver for said composite signal;

a transmitter for said composite signal;

a network including two signal paths coupled in shunt relationship, each of said paths including a source of signal of predetermined frequency cooperating to produce a resultant signal having a frequency predeterminedly related to the frequency of said composite signal;

a first means having given amplitude and phase characteristics disposed in one of said paths to pass at least a selected one of said frequency segments;

a second means having amplitude and phase characteristics disposed in the other of said paths to pass all said frequency segments other than said selected frequency segments;

means coupled to said receiver and said network to control the frequency of both said signal sources to cause the frequency of said resultant signal to follow the frequency of said composite signal;

means to couple said transmitter to said other of said paths;

means coupled to said one of said paths to extract the signal of said selected frequency segments;

the output of said first means being coupled to the source of signal of said one of said paths; and said means to extract being coupled to the output of said source of signal of said one of said paths.

7. A repeater terminal for a communication system transmitting a composite signal including a plurality of frequency segments comprising:

a receiver for said composite signal;

a transmitter for said composite signal;

a network including two signal paths coupled in shunt relationship, each of said paths including a source of signal of predetermined frequency cooperating to produce a resultant signal having a frequency predeterminedly related to the frequency of said composite signal;

a first means having given amplitude and phase characteristics disposed in one of said paths to pass at least a selected one of said frequency segments;

a second means having amplitude and phase characteristics complementary to said given amplitude and phase characteristics disposed in the other of said paths to pass all said frequency segments other than said selected frequency segments;

means coupled to said receiver and said network to control the frequency of both said signal sources to cause the frequency of said resultant signal to follow the frequency of said composite signal;

means coupled to said other of said paths to insert a signal into said selected frequency segments; and means to couple the signal at the output of said second means and the inserted signal to said transmitter.

8. A terminal according to claim 7, wherein:

the output of said second means is coupled to the source of signal of said other of said paths;

said means to insert is coupled to the output of said source of signal of said other of said paths; and said transmitter is coupled to the output of said means to insert.

9. A repeater terminal for a communication system transmitting a composite signal including a plurality of frequency segments comprising:

a receiver for said composite signal;
a transmitter for said composite signal;
a network including two signal paths coupled in shunt relationship,
each of said paths including a source of signal of predetermined frequency cooperating to produce a resultant signal having a frequency predeterminedly related to the frequency of said composite signal;
a first means having given amplitude and phase characteristics disposed in one of said paths to pass at least a selected one of said frequency segments;
a second means having amplitude and phase characteristics complementary to said given amplitude and phase characteristics disposed in the other of said paths to pass all said frequency segments other than said selected frequency segments;
means coupled to said receiver and said network to control the frequency of both said signal sources to cause the frequency of said resultant signal to follow the frequency of said composite signal;
means coupled to said one of said paths to extract the signal of said selected frequency segments;
means coupled to said other of said paths to insert a signal into said selected frequency segments; and
means to couple the signal at the output of said second means and said inserted signal to said transmitter.

10. A terminal according to claim 9, wherein:

the output of said first means is coupled to the source of signal of said one of said paths;
said means to extract is coupled to said output of said first means;
the output of said second means is coupled to the source of signal of said other of said paths;
said means to insert is coupled to the output of said source of signal of said other of said paths; and
said transmitter is coupled to the output of said means to insert.

11. A terminal according to claim 9, wherein:

the output of said first means is coupled to the source of signal of said one of said paths;
said means to extract is coupled to the output of said source of signal of said one of said paths;
the output of said second means is coupled to the source of signal of said other of said paths;
said means to insert is coupled to the output of said source of signal of said other of said paths; and
said transmitter is coupled to the output of said means to insert.

12. A repeater terminal for a communication system transmitting a composite signal comprising:

a receiver for said composite signal;
a transmitter for said composite signal;
first means to generate a first signal having a first predetermined frequency;
second means to generate a second signal having a second predetermined frequency;
means common to said first and second generator means to combine said first and second signals;
means coupled to said receiver and said common means responsive to said received composite signal and said combined first and second signals to produce a control signal proportional to the difference between a predetermined characteristic thereof;
means to couple said control signal to each of said first and second generator means to control the frequency of said first and second signals to cause the frequency of said combined first and second signals to follow the frequency of said received composite signal; and
means to couple said transmitter to at least one of said first and second means.

13. A repeater terminal for a communication system transmitting a composite signal including a plurality of frequency segments comprising:

a receiver for said composite signal;
a transmitter for said composite signal;
a first series circuit including a band pass filter to pass at least a selected one of said frequency segments and a first frequency modulated oscillator to generate a first signal;
a second series circuit including a band rejection filter to pass all said frequency segments other than said selected frequency segments and a second frequency modulated oscillator to generate a second signal;
common means coupled to the output of said first and second oscillators to combine said first and second signals to provide a resultant signal having a frequency equal to the frequency of said received composite signal;
a phase comparator coupled to said receiver and said common means responsive to said received composite signal and said resultant signal to produce a control signal proportional to the phase difference therebetween;
means to couple said control signal to each of said filters to control the frequency of said first and second oscillators to cause the frequency of said resultant signal to follow the frequency of said received composite signal;
means coupled to said first series circuit to extract the signal of said selected frequency segments;
means coupled to said second series circuit to insert a signal into said selected frequency segments; and
means to couple the signal at the output of said band rejection filter and the inserted signal to said transmitter.

14. A terminal according to claim 13, wherein said means to insert includes:

a third series circuit having a second bandpass filter to pass said selected frequency segments and a third frequency modulated oscillator to generate a third signal;
a fourth series circuit having a second band rejection filter to pass all said frequency segments other than said selected frequency segments and a fourth frequency modulated oscillator to generate a fourth signal;
a second common means coupled to the output of said third and fourth oscillators to combine said third and fourth signal to provide a second resultant signal having a frequency equal to the frequency of the signal output of said second oscillator;
a second phase comparator coupled to the output of said second oscillator and said second common means responsive to said second resultant signal and the output signal of said second oscillator to produce a second control signal proportional to the phase difference therebetween;
means to couple said second control signal to each of said second filters to control the frequency of said third and fourth oscillators to cause the frequency of said second resultant signal to follow the frequency of the output signal of said second oscillator;
means coupled to the output of said second band rejection filter to insert said inserted signal; and
means coupling said transmitter to the output of said fourth oscillator.

15. A terminal according to claim 13, wherein said means to insert includes:

a second band rejection filter to pass all said frequency segments other than said selected frequency segments;
a second bandpass filter to pass said selected frequency segments;

a third frequency modulated oscillator coupled in common to said second filters to provide a second resultant signal having a frequency equal to the frequency of the output signal of said second oscillator;
insertion means coupled to the input of said second bandpass filter to insert said inserted signal;
a second phase comparator coupled to the output of said second oscillator and the output of said third oscillator responsive to said second resultant signal and the output of said second oscillator to produce a second control signal proportional to the phase difference therebetween;
means to couple said second control signal to said insertion means and said second band rejection filter to control the frequency of said third oscillator to cause the frequency of said second resultant signal to follow the frequency of the output signal of said second oscillator; and
means coupling said transmitter to the output of said third oscillator.

16. A repeater terminal for a communication system transmitting a composite signal comprising:
a receiver for said composite signal;
a transmitter for said composite signal;
a first frequency modulated oscillator to generate a first signal;
a second frequency modulated oscillator to generate a second signal;
means common to said first and second generator means to combine said first and second signals to provide a resultant signal having a frequency predeterminedly related to the frequency of said received composite signal;
a mixer means coupled to said receiver and said common means responsive to said received composite signal and said resultant signal to produce a beat frequency signal;
a discriminator coupled to said mixer means to produce a control signal proportional to the frequency difference between said received composite signal and said resultant signal;
means to couple said control signal to each of said filters to control the frequency of said first and second oscillators to cause the frequency of said resultant signal to follow the frequency of said received composite signal; and means to couple said transmitter to at least one of said first and second oscillators.

17. A repeater terminal for a communication system transmitting a composite signal including a plurality of frequency segments comprising:
a receiver for said composite signal;
a transmitter for said composite signal;
a first series circuit including a bandpass filter to pass at least a selected one of said frequency segments and a first frequency modulated oscillator to generate a first signal;
a second series circuit including a band rejection filter to pass all said frequency segments other than said selected frequency segments and a second frequency modulated oscillator to generate a second signal;
means common to the output of said first and second oscillators to combine said first and second signals to provide a resultant signal having a frequency predeterminedly related to the frequency of said received composite signal;
a mixer means coupled to said common means and said receiver responsive to said received composite signal and said resultant signal to produce a beat frequency signal;
a discriminator coupled to said mixer means to produce a control signal proportional to the frequency difference between said received composite signal and said resultant signal;
means to couple said control signal to each of said filters to control the frequency of said first and second oscillators to cause the frequency of said resultant signal to follow the frequency of said received composite signal;
means coupled to said first series circuit to extract the signal of said selected frequency segments;
means coupled to said second series circuit to insert a signal into said selected frequency segments; and
means to couple the signal at the output of said band rejection filter and the inserted signal to said transmitter.

References Cited by the Examiner

UNITED STATES PATENTS 2,907,874 10/59 Halborson ------------ 179—170

DAVID G. REDINBAUGH, *Primary Examiner.*